(12) United States Patent
Koukios

(10) Patent No.: US 8,471,080 B2
(45) Date of Patent: Jun. 25, 2013

(54) METHOD FOR THE REMOVAL OF INORGANIC COMPOUNDS OF BIOMASS FROM AGRICULTURAL, FOREST AND URBAN SOURCES

(75) Inventor: Emmanouil Koukios, Agia Paraskevi (GR)

(73) Assignee: Thesmorefinery Technologies LLC, Boca Raton, FL (US)

( * ) Notice: Subject to any disclaimer, the term of this patent is extended or adjusted under 35 U.S.C. 154(b) by 737 days.

(21) Appl. No.: 12/666,793

(22) PCT Filed: Jun. 27, 2008

(86) PCT No.: PCT/EP2008/058220
§ 371 (c)(1),
(2), (4) Date: Dec. 24, 2009

(87) PCT Pub. No.: WO2009/003920
PCT Pub. Date: Jan. 8, 2009

(65) Prior Publication Data
US 2010/0181183 A1    Jul. 22, 2010

(30) Foreign Application Priority Data
Jun. 29, 2007 (GR) .............................. 20070100416

(51) Int. Cl.
*C07C 1/00* (2006.01)
(52) U.S. Cl.
USPC ............... 585/240; 585/242; 44/605; 44/606; 201/35
(58) Field of Classification Search
CPC .................................. Y02E 50/13; C10G 3/00
USPC .............. 585/240, 242; 44/605, 606; 201/35
See application file for complete search history.

(56) References Cited

U.S. PATENT DOCUMENTS

| 3,950,143 A | * | 4/1976 | Pyle ................................ 44/500 |
| 4,313,011 A | * | 1/1982 | Weil et al. ..................... 585/240 |
| 4,787,917 A | * | 11/1988 | Leclerc de Bussy ........... 44/606 |
| 5,023,097 A | * | 6/1991 | Tyson ............................ 426/271 |
| 5,542,962 A | * | 8/1996 | Ollerenshaw et al. ............ 71/10 |

FOREIGN PATENT DOCUMENTS

NL        1029909 C2    3/2007

OTHER PUBLICATIONS

"Removal of Inorganic Constitutents of Biomass Feedstocks by Mechanical Dewatering and Leaching", Scott Q. Turn et al, Biomass and Bioenergy, Vo. 12, No. 4, pp. 241-252, 1997, published by Elsevier Science Ltd.*

* cited by examiner

*Primary Examiner* — Nina Bhat
(74) *Attorney, Agent, or Firm* — Skokos Law Group LLC

(57) ABSTRACT

Described is a methodology aiming to the removal of harmful ash constituents from the ash of biomass, such as alkali metals, chlorine and sulfur, prior to is thermochemical conversion, in order to minimize/eliminate the ash-related corrosion, deposition and agglomeration problems, as well as the emissions of alkali metals, chlorine and sulfur. This removal is achieved by a combined pre-treatment which includes prepyrolysis of biomass at temperatures varying in the range of 200-300° C. and for a period of 5 min up to 2 h, followed by the leaching of the biomass materials using water with a solid/water mass ratio varying from 33 g/L up to 300 g/L with water temperature varying from 13° up to 55° C. and residence time varying from 5 min up to 24 h.

8 Claims, No Drawings

METHOD FOR THE REMOVAL OF INORGANIC COMPOUNDS OF BIOMASS FROM AGRICULTURAL, FOREST AND URBAN SOURCES

The present application has its priority in the European Patent application EP2008/058220 filed on Jun. 27, 2008 and Greek Patent Application 200700100416 filed on Jun. 29, 2007, by the present applicant.

TECHNICAL FIELD

This invention relates to the industries involved in the removal of inorganic constituents, such as the potassium, sodium, chlorine and sulfur, from biomass materials deriving from agricultural, forest and municipal environments.

DISCLOSURE OF INVENTION

The present invention concerns a method for the removal of inorganic constituents, such as the potassium, sodium, chlorine and sulfur, from biomass materials deriving from agricultural, forest and municipal environments; this method is capable to minimize/eliminate the ash-related problems such as corrosion, deposition and agglomeration, as well as problems of gaseous emissions, such as potassium, sodium, chlorine and sulfur, during the thermo-chemical combustion, gasification, pyrolysis of biomass materials offering substantial economic and environmental benefits.

The problems caused today during the thermochemical combustion, gasification, pyrolysis of biomass deriving from agricultural, forest and municipal environment, such as the various types of straw, various wastes of agricultural industries, such as of cotton, olive, pistachio, etc., as well as tree trimmings and wood being used in construction activities or the production of furniture, are mainly caused due to the composition of their ash. The ash of these biomass materials is very rich in alkali metals, chlorine and sulfur and during the thermo-chemical conversion of biomass it creates gases, liquid and solids that tend to react with each other, as well as with the inorganic constituents which are present during the conversion, as well as with the metal surfaces, and cause problems of corrosion, deposition and agglomeration, as well as emissions of gaseous pollutants that result into large economic losses, formation of environmental problems, and hinder the utilization of the particular biomass materials as feedstocks in large scale applications, as well as in combination with the other solid or gas fuels for the production of energy, liquid fuels and chemicals.

The successful mitigation of the above problems will result in a broader use of biomass materials for the production of energy, liquid fuels and chemicals with substantial economic and environmental benefits, specifically today when the cost of the imported energy appears to increase continuously and there is interest and an urgent need for the reduction of the fuel gas emissions, resulting from the use of solid fuels, for the successful mitigation of the greenhouse effect.

The presently used techniques and methods in order to solve these problems appear to have limited success and, as a result, the utilization of biomass in the thermochemical conversion seems to be very limited worldwide, concerning mainly biomass types such as wood, which cause the least problems.

The object of this invention is to achieve the removal of harmful ash components from biomass materials, such as alkali metals, chlorine and sulfur, prior to the thermochemical conversion of biomass, so that to minimize/eliminate the ash-related corrosion, deposition, agglomeration problems, as well as the emissions of alkali metals, chlorine and sulfur.

This object if achieved with the used of a method that includes the hydro-thermal processing of the different biomass materials.

MODES FOR CARRYING OUT THE INVENTION

The biomass materials are first prepyrolyzed at temperatures varying from 200° C.-300° C. for a period of 5 minutes up to 2 hours. Then, the prepyrolized biomass samples are leached using water—any kind of water from a public system, spring, etc. can be used—using a solid/water mass ratio that may vary from 33 g/L up to 300 g/L and in temperatures varying from 13° C. up to 55° C. for a period residence time varying from 5 min up to 24 h. The solid to water ratio as well as the temperature and residence time depend on the type of treated biomass, After the end of leaching stage, the pretreated material is left to dry in the open air atmosphere or it is dried using rotary dryers depending on the season and the climate of the region. The so pre-treated material is found to be free of chlorine and to contain small amounts of alkali metals and sulfur varying in the ranges of 30-50% and 35-55% of the respective amounts in the original untreated biomass materials.

The method for the removal of the harmful inorganic constituents from biomass prior to the thermochemical conversion of the biomass, according to the invention, includes the following steps: a) prepyrolysing the biomass materials at temperatures varying 200° C.-300° C. for a period of 5 minutes up to 2 hours; b) leaching the prepyrolyzed biomass material using water with a solid/water mass ratio that may vary from 33 gram biomass per liter up to 300 gram biomass per liter, in temperatures varying from 13° C. up to 55° C. for a period of residence time varying from 5 minutes up to 24 hours.

The prepyrolized and leached biomass may be left to dry in the open air atmosphere. Alternatively, the prepyrolized and leached biomass material may be dried using rotary dryers, The best and most economically viable results have been observed when the biomass material is prepyrolized in a temperature varying from 200° C. to 250° C. and/or the biomass material is prepyrolized for a period of residence varying from 10 min to 40 min. In another embodiment the biomass material is prepyrolized for a period of about 1 hour.

The water that is used for leaching the prepyrolized biomass material may be water from a public system.

The biomass can be derived from agricultural forest and urban sources.

Initially the biomass is heated up in an air-free atmosphere at temperatures ranging from 200° C. up to 300° C. with the best and most economically viable results observed in the temperature range between 200° C. and 250° C. and for a residence time varying from 5 min up to 2 hours and with the best and most economically viable results being observed for a residence time 10 min up to 40 min. This process, which is called prepyrolysis, results in the degradation of the biomass structure, and its transformation into a material with an increased content of fixed carbon, whereas a small amount of gases, containing mainly $H_2O$, $CO_2$, CO, as well as light organic molecules, is set free into the atmosphere. This material is seen to experience a mass loss during the process that can vary from 5% up to 40% dry basis depending on the applied conditions, and in the best case below 20%, as well as a loss in heating value that can vary from 5% up to 20%, and under optimal conditions in the area from 7% up to 10%.

The resulting material from the prepyrolysis, i.e, the prepyrolysed material, is then subjected to leaching using water with a solid/water mass ratio that may vary from 33 g/L up to 300 g/L and in temperatures varying from 13° C. up to 55° C. for a period of residence time varying from 5 min up to 24 h. Any kind of water from a public system, spring, etc. can be used. The solid/water ratio applied, as well as the residence time and temperature depend on the type of the treated biomass material. After the end of the leaching process the material is left to dry in the open air atmosphere or it is dried using rotary dryers depending on the season and the climate of the region. The produced material is found to be free of chlorine and to contain very small amounts of alkali metals, ranging between 30% and 50% of the initial content, as well as sulfur ranging between 35% and 55% of the initial content.

The resulting material after the completion of the two treatment stages has the following characteristics: a low moisture content and hydrophobic behavior; high grindability, being easy to reduce its particle size and to be mixed really with other materials, e/g. coal; a higher content of fixed carbon and a lower content of volatile materials compared to the original biomass; the pre-treated material retains the largest part of the initial energy content, higher than 90%, of the untreated biomass; the pre-treated biomass is also chlorine—free, contains substantially lower amounts of alkali metals as well as sulfur compared to the original untreated biomass.

The effect of the process is to eliminate the chlorine emissions and as a result all corrosion, deposition and agglomeration problems caused by a chlorine and its compounds. There are also substantially reduced and/or eliminated emissions of alkali metals and sulfur that result into the minimization of the corrosion, deposition and agglomeration problems caused by the alkali metals as well as the sulfur present in the ash of the biomass materials. The results obtained in the laboratory have shown that the chlorine emissions are always totally eliminated regardless of the type of the biomass material tested. As far as it concerns the emissions of alkali metals ad sulfur, these can fluctuate from zero up to substantially reduced compared to those observed in the case of the original untreated biomass, depending on the different biomass used as well as on the composition of its ash.

The following examples describe the effect of the invention on two different and very important biomass.

Example No. 1

Wheat straw from the area of Trikala (Thessaly, Greece) is prepyrolyzed at 300° C. for 1 h and then it is subjected to leaching using water for 4 h and a solid/water mass ratio of 67 g/L. Ash analysis has shown that the pre-treated material does not contain any chlorine and that the concentrations of alkali metals and sulfur were found to be lower by 50% and 40%, respectively, compared to the untreated material. Ash thermal analysis using a thermal gravimetric analyzer up to 900° C. showed that the ash material did not experience any mass loss in the temperature range of 800-900° C. in which chlorine and alkali metals emissions are observed.

Example No. 2

Olive kernel residue from an olive kernel-oil factory in area of Messinia (Pelloponisos, Greece) is prepyrolized at 250° C. for 1 h and then it is leached using water for 4 h and a solid/water mass ratio of 90 g/L. Ash elemental analysis is at the end of the pre-treatment process showed that the pre-treated material does not contain any chlorine and that the concentrations of alkali metals and sulfur were lower by 50% and 35%, respectively, compared to the untreated material. Ash thermal analysis using a thermal gravimetric analyzer up to 900° C. showed that the ash material experienced a small mass loss in the temperature range of 850-900° C. due to the release of potassium oxide, which is caused by thermal decomposition of potassium carbonates and the lack of sufficient amount of silicon dioxide to react with the potassium oxide and bound it in the solid phase.

The invention claimed is:

1. A method for the removal of harmful inorganic constituents from biomass prior to the thermochemical conversion of the biomass including the following steps:
   a) Prepyrolyzing the biomass materials at temperatures varying from 200° C.-300° C. for a period of 10 minutes up to 2 hours;
   b) Leaching the prepyrolyzed biomass material using water with a solid/water mass ratio that varies from 33 gram biomass per liter up to 300 gram biomass per liter, in temperatures varying from 13° C. up to 55° C. for a period of residence time varying from 5 minutes up to 24 hours.

2. A method according to claim 1, whereby the prepyrolyzed and leached biomass material is left to dry in the open air atmosphere.

3. A method according to claim 1, whereby the prepyrolyzed and leached biomass material is dried using rotary dryers.

4. A method according to claim 1, whereby the biomass material is prepyrolyzed in a temperature varying from 200° C. up to 250° C.

5. A method according to claim 1, whereby the biomass material is prepyrolyzed for a period of about 1 h.

6. A method according to claim 1, whereby the biomass is prepyrolyzed for a period of residence between 10 min. and 40 min.

7. A method according to claim 1 whereby the prepyrolized biomass is leached using water from a public system.

8. A method according to claim 1, whereby the biomass is derived from agricultural forest and urban sources.

* * * * *